July 13, 1937.  E. C. MEYER  2,086,569
COUPLING AND VALVED COUPLING
Filed July 11, 1933  3 Sheets-Sheet 1
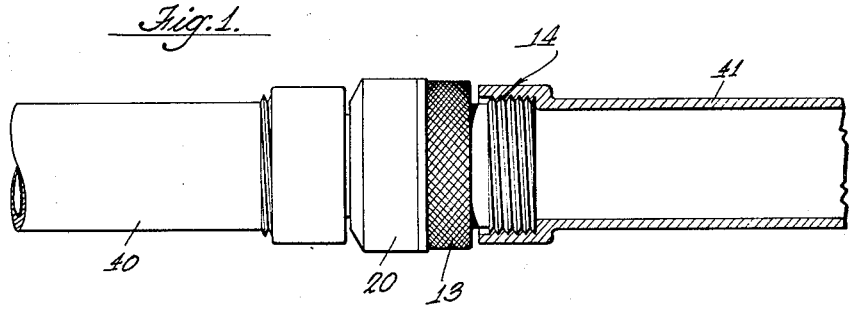
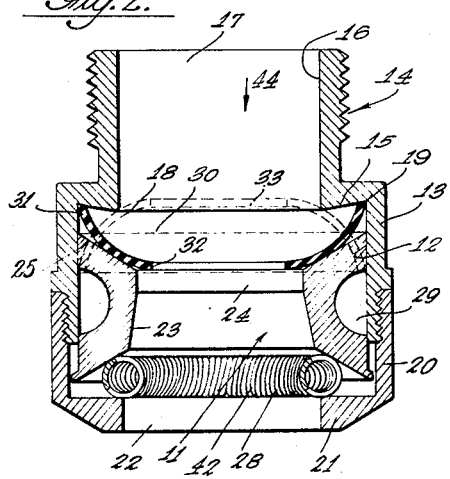
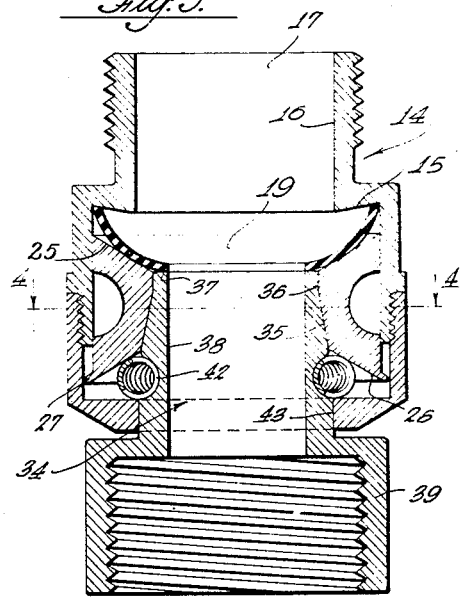
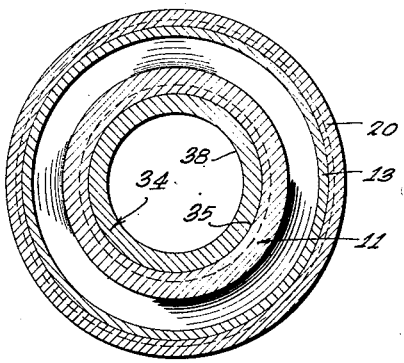
INVENTOR
E. C. MEYER
By
Hazard & Miller
ATTORNEYS July 13, 1937. E. C. MEYER 2,086,569
COUPLING AND VALVED COUPLING
Filed July 11, 1933 3 Sheets-Sheet 2
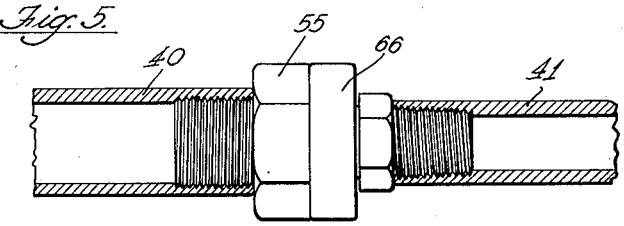
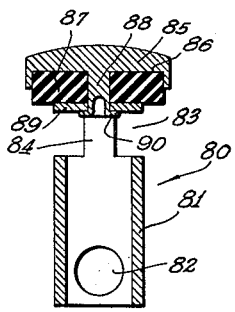
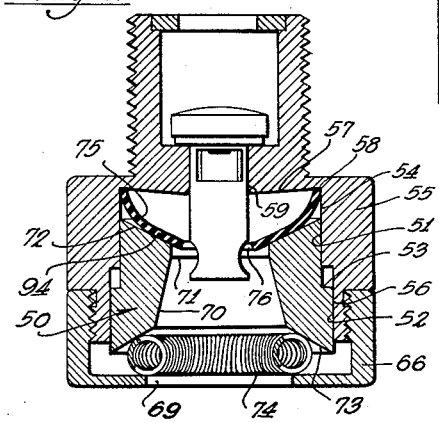
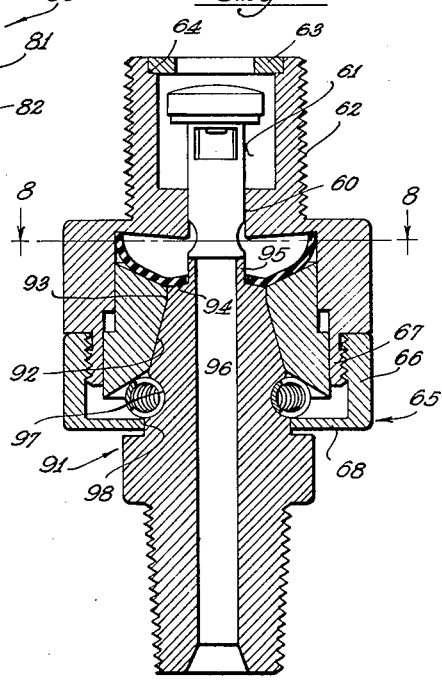
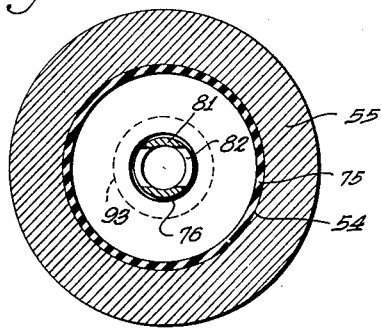
INVENTOR
E. C. MEYER
By Hazard & Miller
ATTORNEYS July 13, 1937. E. C. MEYER 2,086,569
COUPLING AND VALVED COUPLING
Filed July 11, 1933 3 Sheets-Sheet 3

INVENTOR
E. C. MEYER
By Hazard & Miller
ATTORNEYS

Patented July 13, 1937

2,086,569

UNITED STATES PATENT OFFICE 2,086,569

COUPLING AND VALVED COUPLING

Edwin C. Meyer, Los Angeles, Calif., assignor to Meyer Coupling Company, Inc.

Application July 11, 1933, Serial No. 679,881

13 Claims. (Cl. 284—19)

My invention relates to a coupling somewhat of the type illustrated in my United States Patent 1,754,639, for Couplings patented April 15, 1930.

In this type of coupling, a tubular beveled piston is slidable within limits in a cylindrical structure of the coupling, a washer or packing ring or disk engages an end sloping surface of the piston, and an expansible and contractible resilient ring engages the outwardly sloping base of the piston structure. Engaging with this piston there is a nipple tapered to fit the internal taper of the piston and with an annular groove in which fits the annular expansible and contractible ring. The action is such that the greater the pressure on the end of the piston having the packing disk or ring, the tighter is the attachment of the nipple and the piston due to the expansible and contractible ring being wedged into the annular groove of the nipple.

One of the detailed features of improvement of my invention is forming the nipple and a portion of the piston with cylindrical contact surfaces and thereby preventing a side wobbling action of a tapered nipple in an internally tapered piston. The cylindrical sections may be near the end portion of the tapered nipple, such nipple having a conical taper, and near the smallest portion of the conically internally tapered piston. By employing these contacting cylindrical surfaces, as the pressure on the piston increases, the cylindrical surfaces are forced into longitudinal engagement and thus form a stiff and firm holding construction for the nipple and any supply pipe connected thereto.

Another detailed feature of my invention in the construction of the cylindrical chamber for the piston at the end receiving the packing ring and disk is that this has a beveled surface adapted to reverse the direction of the curvature of the resilient ring or disk after insertion in the cylinder and engagement by the moving piston. This beveled surface has an inner circular edge which may be engaged by a cupped washer or packing disk, the edges of the disk extending in an opposite direction to the beveled surface, whereby on pressure being applied to the free edge of the disk, this reverses its position, causing the edge of the disk to engage the tapered portion of the piston cylinder end wall.

Another detailed feature of my invention in certain forms is constructing the piston with a rim or bead which prevents inserting a piston in the piston cylinder in the wrong direction.

Another object and feature of my invention is the employment of a valve in connection with the coupling, this valve being automatically actuated when the coupling is connected together to open a passage through the coupling, and when the nipple is disassembled from the piston cylinder construction the valve is automatically closed. By this construction, on inserting the nipple into engagement with the movable cylinder, the end of the valve is pressed longitudinally of a portion of the coupling and opens the valve construction, but when the nipple is withdrawn the pressure of fluid automatically closes the valve.

Another feature of my invention for light pressures and having the valve is employing a spring to close the valve instead of relying on the pressure of the fluid medium in the valve.

Another detailed feature in connection with the design of coupling for low pressures is molding the rubber or resilient ring or disk to the proper shape to engage the upper end of the piston and the nipple.

Another detailed feature of my invention is forming the nipple so that it may have a metal to metal seat or bearing with a feed pipe or the like through which liquid or gas may be passed.

My invention is illustrated in the accompanying drawings, in which:

Fig. 1 is a side elevation of a coupling formed of the elements illustrated in Figs. 2 and 3.

Fig. 2 is a longitudinal section of the piston element of the coupling.

Fig. 3 is a longitudinal section of the coupling with the nipple connected to the piston section.

Fig. 4 is a transverse section on the line 4—4 of Fig. 3 in the direction of the arrows.

Fig. 5 is a longitudinal section of an alternative form of coupling.

Fig. 6 is a longitudinal section of the piston section, showing a valve in closed position.

Fig. 7 is a longitudinal section of the coupling with the nipple and piston sections connected and the valve opened.

Fig. 8 is a transverse section on the line 8—8 of Fig. 7 in the direction of the arrows.

Fig. 9 is a longitudinal section of another modification of a valved coupling suitable for low pressures.

Figure 10:
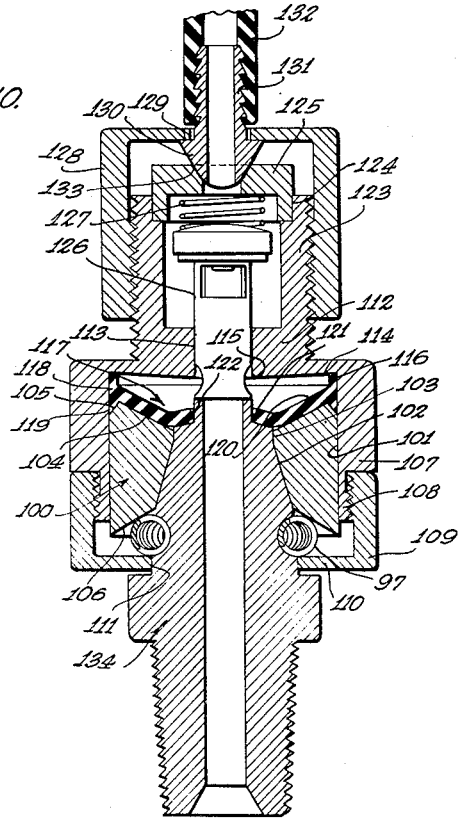
Fig. 10 is a longitudinal section of a valved coupling suitable for low pressures and showing a metal to metal connection to a hose.

Referring first to Fig. 2. In this there is the piston designated by the assembly numeral 11.

This piston has a cylindrical outer surface 12 which slides in the cylindrical sleeve 13 of the housing 14. This housing has an inwardly extending shoulder 15, this being annular, connecting to the passage 16 of the externally threaded pipe connection 17. A feature of my invention is that the shoulder 15 is not squarely or diametrically across the housing but the rim or edge 18 projects toward the piston a greater distance than the outside edge 19 of the shoulder. A retaining cap 20 is threaded on the cylindrical sleeve 13 and has an inturned end 21 with an opening 22. The piston has an internal conical surface 23 with a short cylindrical surface 24 thereabove and is provided with an upwardly and outwardly sloping top or pressure surface 25. The lower or wedging surface 26 slopes downwardly and outwardly and terminates at an annular fin 27, which fin is larger in diameter than the diameter of the sleeve 13 and prevents inserting the piston the wrong way in the sleeve, and also limits the distance the sleeve can move inwardly in the coupling housing. An expansible ring 28 formed of coiled wire is fitted between the surface 26 and the inturned end 21 of the cap 20. The piston is illustrated as having an annular groove 29 to lessen the weight of the piston.

A washer or resilient packing ring 30 has an upper edge 31 which engages in the corner 19 at the outside of the shoulder 15. This washer follows a cup-shaped curve and has a central opening 32 of lesser diameter than the diameter of the cylindrical section 24 of the piston. In inserting the washer, this is placed in the position shown in dotted lines 33, that is, with the bottom portion having the opening 32 upwardly. As the piston is pressed inwardly it causes the washer to fulcrum on the edge 18 until, on account of the resiliency of the washer, it gives a quick flip and reverses its position from that shown dotted in Fig. 2 to the full line of such figure.

The sloping shoulder 15 functions in part when the dome-shaped packing washer is in the assembled operative position to retain the peripheral edge 31 of the washer at the circular corner formed at the outside edge 19 of the shoulder at its junction with the cylindrical sleeve 13 and prevents any portion of the peripheral edge 31 being forced inwardly towards the passage 16. Therefore, when the passage 16 is of considerable diameter compared with the diameter of the sleeve 13, there is no danger of the resilient cupped washer being crumpled and forced upwardly through the passage 16.

The nipple, designated by the assembly numeral 34, has a conically shaped section 35 conforming to the surface 23 of the piston and a cylindrical section 36 corresponding to the section 24 of the piston. The upper edge 37 is squared, that is, transverse to the axis, and is designed to engage under the portion of the washer which extends inwardly beyond the piston so that the opening 32 of the washer is substantially in alignment with the tubular passage 38 of the nipple. The base of the nipple is illustrated as connected to an internally threaded sleeve or collar 39, to which may be connected a pipe 40 (note Fig. 1). A pipe 41 (Fig. 1) is illustrated as attached to the externally threaded pipe connection 17.

The nipple has an annular groove 42, and below this groove there is a cylindrical section 43 adapted to fit in the opening 22 of the cap 20.

The manner of assembling the coupling of Figs. 1 through 4, is as follows:

The nipple is pressed upwardly, the cylindrical upper tip passing inside of the ring 28 and the tapered section expanding this ring until the nipple is fully inserted, bearing against the conical surface 29 and the cylindrical surface 24 of the piston, whence the ring slips into the annular groove 42. The cup washer has taken the position shown in Figs. 2 and 3. Thus, when a fluid under pressure is fed through the coupling in the direction of the arrow 44, that is, from the distance side, a pressure is exerted through the medium of the washer on the piston, tending to force this piston downwardly. As the resilient ring is engaged in the annular groove on the nipple and also against the end 21, the wedging surface 26 tends to force the ring tighter into this annular groove 42 and thus securely holding the nipple in place in the coupling, and the greater the pressure of the liquid or gas passing through the coupling, the tighter is the connection.

In the construction of Figs. 5 through 8, the piston 50 is illustrated as having a cylindrical section 51 of a lesser diameter and another cylindrical section 52 of a greater diameter, and an annular shoulder 53. The section 51 slides in the smaller bore 54 of the sleeve 55, and the section 52 in the larger bore 56 of this sleeve. The base 57 of the sleeve has a slope toward the piston so that the outside edge 58 is further from the piston than the fulcrum edge 59. The valve opening 60 leads to a chamber 61 in the pipe connection 62, this being externally threaded and having a pressed washer 63 in the end, this fitting in an annular recess 64. The purpose of the washer will be detailed hereinunder.

A retaining cap 65 has a cylindrical wall 66 threaded on the threaded extension 67 of the sleeve 55. This cap has an inturned base 68 with a circular opening 69.

The piston has a conical internal surface 70, a cylindrical surface 71, and a top outwardly sloping pressure surface 72. The bottom outwardly sloping surface 73 is the wedge surface. A coiled wire expansible ring 74 is fitted between the pressure surface 73 and the base 68 of the cap 65. A resilient washer 75 is fitted in the sleeve. This has its outer edge bearing against the outer portion 58 of the base 57 of the sleeve. The washer projects inwardly beyond the cylindrical surface 71 of the piston and has a circular opening 76. This washer is inserted in a reverse position, that is, with the opening portion 76 adjacent the fulcrum edge 59 and the outside edge either against the piston or the cylindrical inside wall of the sleeve. A pressure on the washer then causes it to reverse to the full line position of Fig. 6, the reversal being the same as illustrated in connection with Fig. 2.

A valve designated 80 is formed of a tube 81 having a pair of diametrically opposite ports 82 at the bottom and two ports 83 at the top. Such upper ports are spaced by the web 84 of the side wall of the tube 81. A head 85 is secured to the webs 84. This has a pocket 86 therein in which there is a resilient washer 87. A rivet 88 is secured to the head and extends through the center opening of the washer, passes through a metal washer 89, and has a riveted head 90. This rivet head holds the washer 87 in place.

The nipple 91 has a tapering surface 92 to conform to the surface 70 of the piston, and a cylindrical section 93 corresponding to the cylindrical section 71 of the piston. The upper shoulder 94 of the nipple slopes upwardly and connects to the projection 95. The nipple has a bore 96. Exteriorly there is an annular groove 97 and below the groove a cylindrical section 98 to fit in the opening 69.

In Fig. 10 I illustrate a modified construction of coupling suitable for low pressure. In this case, the piston 100 is constructed with a cylindrical outside surface 101, an upwardly and inwardly sloping surface 102, a cylindrical surface 103 thereabove, a top pressure surface 104 inclined upwardly and outwardly, and a downwardly inclined short surface 105 joining with the cylindrical surface. At the bottom there is the upwardly and inwardly sloping wedging surface 106. The piston is housed in a cylindrical sleeve 107, the sleeve having a screwthreaded portion 108 at the bottom, to which is connected the cup-shaped cap 109, this having an inturned base 110 with a central opening 111. The head 112 of the sleeve 107 has an opening 113 therethrough, and the shoulder 114 is provided with a fulcrum edge 115. The shoulder 114 slopes downwardly from the outer corner 116 to the fulcrum edge 115, although in this type of low pressure coupling it is preferable to use a molded washer.

This molded washer, designated 117, has an annular vertical rim 118 formed cylindrical with a pointed fin 119 at the lower edge, this fin fitting against the sloping surface 105 of the piston. The washer is molded so that the section 120 bears against the pressure surface 104 of the piston, and the inner portion 121 adjacent the opening 122 of the washer is free to bend.

An exteriorly threaded pipe connector 123 extends upwardly from the head 112. This has a recess 124 at the top with a washer 125 having a pressed fit therein. A valve 126 is slidable in the opening 113 in the head 112 and such valve may be constructed similar to the valve of Figs. 6 through 9, as above described. In this case, however, a compression spring 127 bears against the washer 125 and the head of the valve, thus tending to close the valve even under low pressures of gas or liquid passing through the coupling.

A complementary pipe coupling 128 is threaded exteriorly on the coupling 123 and this engages a shoulder 129 on the cone-shaped head 130 of a nipple 131, to which nipple a rubber hose 132 may be connected. The cone-shaped head has a seat on the cone surface 133 of the washer 125. This gives a metal to metal seat.

The nipple, designated by the assembly numeral 134, may be the same as described in connection with Fig. 7. In this case the upper shoulder 94 engages the washer adjacent the center opening and bends this washer slightly upwardly. The spring ring 97, which is the same as in Fig. 7, engages in a groove in the nipple and retains this in place.

The manner of operation and functioning of the valved coupling of Figs. 5 through 10 is substantially as follows:

In the valve of Figs. 5 and 6, when the piston section is connected to a pipe or hose having a liquid or gas under pressure, the valve is held closed by such pressure due to the pressure on the head 85 of the valve. This seats the resilient washer 87 on the bottom of the pipe fitting having the chamber 61. In the construction of Fig. 10, the spring 127 maintains the valve in the closed position independent of the light pressure from a gas or liquid.

When the nipple is inserted in a coupling, the projection 95 at the top extends upwardly through the central opening of the resilient washers and engages the lower edge of the valve, forcing this upwardly from the position of Fig. 6 to that of Fig. 7 for the valve without the spring, and to the position shown in Fig. 10 for the spring-actuated valve. This opens the gas or liquid connection through the ports 80 at the bottom and 83 at the top.

Figure 11:
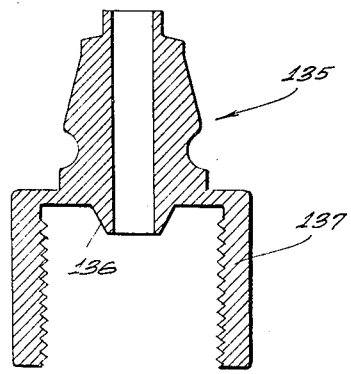
Fig. 11 is a longitudinal section of a modified nipple showing a metal to metal bearing in the sleeve of the nipple.

In the construction of Fig. 11, I illustrate a nipple 135, which is substantially as shown in Figs. 7 and 10 as far as the cooperative action with the piston and contraction spring is concerned. However, in this case, a coned projection 136 is formed inside the internal threaded sleeve or collar 137. The projection 136 may be used to form a metal to metal connection.

An important characteristic of my invention as it relates to the valve 80 of Figs. 6, 7, 8 and 9, or the valve 126 of Fig. 10, is that this valve is tubular and is open at the lower end and is engaged by the cylindrical extension of the nipple. The valve has a closed head with a sealing washer which bears on the seat in the chamber in which this head operates and immediately below this head and sealing washer there is an upper port and adjacent the lower end there are the lateral ports 82. Thus when the nipple is withdrawn and this valve is seated as shown in Fig. 6, there is a double seal caused by the sealing washer engaging the base of the chamber in which the head of the valve operates and also the upper ports 83 are closed by the structure through which the valve operates. However, when the valve is opened by the coupling assembly being completed by the piston and nipple, the nipple thrusts the valve upwardly into the positions of Figs. 7 and 10 so that there is a communication through the ports 83 and 82 to the pressure chamber developed between the cupped packing washer 75 of Fig. 6 and 117 of Fig. 10. Thus a fluid being transmitted developes a pressure in this chamber, tightly pressing the washer at its sides against the cylindrical sleeve, also tightly against the pressure surface of the piston and the pressure surface of the nipple, thereby developing a tight seal at the joint between the piston and the nipple and between the piston and the sleeve.

Also, on account of the cup washer being forced upwardly so that its annular edge engages the inwardly turned shoulder of the sleeve, there is a tight seal at this annular edge. In addition to forming this tight seal by the pressure fluid, there is a direct tubular communication through the tubular valve, the bore of the nipple as indicated by this bore 96 of Fig. 7. Hence, this tubular valve has the function when opened of creating a pressure in the closed chamber defined on one side by the cupped washer and also transmitting directly the fluid through the valve and through the nipple.

With my present construction, as it is desirable to form a contact between the annular end of the cupped washer and the inturned shoulder at the head of the sleeve, it is necessary that the piston be forced upwardly by assembling the nipple a sufficient distance to obtain this contact. As it is necessary to have a three-point contact of the spring with the lower surface of the piston, the groove of the nipple and the inturned base 68 of the retaining cap 65 (note Fig. 7), this cap is made adjustable on the sleeve by a screw threaded connection.

Another desirable feature of my invention, particularly as shown in Fig. 10, relates to the attachment of the cone-shaped head 130 of the nipple 131 which carries the rubber hose, this engaging a cone face of the washer 125, giving a metal to metal seat, but in order to form a tight seal it is necessary to use the pipe coupling 128 which is threaded on the pipe connector 123. This therefore gives a fluid-tight joint by which fluid under high pressure may be transmitted to the chamber in this connector 123.

Various changes may be made in the details of construction without departing from the spirit or scope of the invention as described in the appended claims.

I claim:

1. A coupling having a piston slidable in a sleeve, said piston having a tapered inside surface, a sloping top pressure surface, and a sloping wedging lower surface, the sleeve having an inwardly extending shoulder with an annular fulcrum edge extending toward the piston to a greater extent than the outside edge of the shoulder, a resilient cup-shaped washer fitted in the sleeve and bearing on the pressure surface of the piston and the outer portion of the shoulder, a nipple having an external tapered surface to engage with the internal surface of the piston and having an annular groove, and a contracting circular spring fitted in said groove and bearing against the wedging surface of the piston said fulcrum edge being adapted to reverse the curvature of the washer during assembly.

2. In a coupling, a pipe, an outwardly extending shoulder at the end of the pipe, and a cylindrical sleeve connected to the shoulder concentric with the pipe, the end of the pipe at the shoulder having a fulcrum edge, the shoulder being beveled with the fulcrum edge extending a greater distance into the sleeve than the outside corner of the shoulder and the sleeve, a tubular cylindrical piston slidable in the sleeve, an arch-shaped washer having its free outer ends engaging the piston, and an inner portion engaging the fulcrum edge in assembly, said washer being adapted to arch in the opposite direction by inward pressure and movement of the piston whereby the peripheral edges of the washer fit in the corner adjacent the shoulder and said sleeve and a central portion engaging the piston, a tubular nipple engaging the piston and washer and means to attach the nipple to the sleeve.

3. A coupling having a cylindrical sleeve with an inwardly extending shoulder portion and an opening therethrough, a piston slidable in the cylindrical sleeve and having an upwardly and outwardly sloping pressure surface with a short reversed outwardly and downwardly inclined surface meeting the cylindrical sleeve, a cup-shaped washer seated on the pressure surface of the piston and having an annular rim bearing against the cylindrical sleeve, and a fin engaging the outwardly inclined surface of the piston, the said piston having a central opening therethrough, a nipple engaging in the said opening and means to attach the nipple and the piston together.

4. A coupling as claimed in claim 3, the said shoulder having a downwardly sloping surface extending towards the piston and having a fulcrum edge at the opening through the shoulder, the said fulcrum edge being adapted to engage a portion of the washer when the washer is cupped in the reverse direction during assembly, and to change the curvature of the washer on the upward pressure of the piston.

5. In a coupling, a pipe, an outwardly extending shoulder at the end of the pipe, a cylindrical sleeve connected to the shoulder concentric to the pipe, the end of the pipe at the shoulder having a fulcrum edge, the shoulder being bevelled with the fulcrum edge extending a greater distance into the sleeve than the outside corner of the shoulder and the sleeve, a cylindrical tubular piston slidable in the sleeve and having an upwardly and outwardly sloping pressure surface, a dome shaped flexible washer being insertable in the sleeve with the dome upwardly engaging the fulcrum edge and the peripheral edges of the washer engaging the pressure surface of the piston in assembly and in which inward and upward movement of the piston is adapted to reverse the flexure of the washer to bring the dome portion of the washer into contact with the pressure surface of the piston and the peripheral edge of the washer engaging the corner formed by the shoulder and the said sleeve, a tubular nipple engaging the piston and washer and means to attach the nipple to the sleeve.

6. A coupling having a sleeve with a shoulder, said shoulder having an opening leading to a chamber with a base, a tubular piston slidable in the sleeve and having a pressure surface, a tubular nipple fitted in the piston and having a pressure surface, a washer engaging the said pressure surfaces and the sleeve and defining a pressure space between the washer and the shoulder, means to lock the sleeve, piston and nipple in operative position, a tubular valve slidable in said opening and having means to form a seal on the said base when the nipple is removed from the piston, said valve having ports to be positioned in the said chamber and second ports to communicate with the pressure space when said valve is open, and the nipple having means to unseat the valve whereby a fluid under pressure may pass between the said chamber through both ports to the pressure space and through the valve and the nipple.

7. A coupling as claimed in claim 6, the means to unseat the valve comprising an extension of the nipple passing through the washer and also operating to center the washer on the pressure surface of the nipple.

8. A coupling having a cylindrical sleeve with a shoulder, said shoulder having an opening leading to a chamber with a base, a tubular piston slidable in the sleeve and having an upper pressure surface, a tubular nipple fitted in the piston and having an upper pressure surface, means to lock the sleeve, piston and nipple in operative position, a washer engaging the said pressure surfaces of the piston and nipple and engaging the cylindrical sleeve, a tubular valve slidable in the said opening and having a closed head operating in the said chamber, a first port immediately below the head closed by the shoulder structure when said valve is in its closed position, said port being exposed in the chamber when the valve is in its open position, said valve having a lower port always located in a pressure chamber defined by the shoulder of the sleeve, the sleeve and the cup washer, the nipple having means to unseat the valve and thrust said valve into its open position on assembling the nipple in the piston and locking the nipple therein, there being a direct connection through the bottom of the tubular valve to the tubular nipple, whereby a pressure fluid is developed through the ports of the valve when the valve is opened to the said pressure chamber, thereby forcing the cup washer into a tight sealing relation with the sleeve, the piston and the nipple and transmitting fluid directly through the valve and through the tubular nipple.

9. A coupling as claimed in claim 8, the head of the valve being of larger diameter than the opening, a rivet secured to the head, a sealing washer attached to the head by the said rivet, the said washer forming a seal on the base of the chamber in which the head of the valve operates.

10. A coupling having a cylindrical sleeve, an inturned shoulder structure at one end of the sleeve, an inturned base structure at the other end of the sleeve, the shoulder structure having an opening and a chamber above said opening, the base of the chamber forming a seat, the base also having an opening, a piston slidable in the sleeve and having an upper pressure surface, a tapered bore and a sloping wedging surface, a tubular nipple having an upper pressure surface, a sloping surface engaging the tapered bore of the piston and an annular groove, a coil spring in the groove engaging the wedging surface of the piston and a part of the inturned base and retaining the nipple and piston in locked relation, a resilient cup washer having a base engaging the pressure surface of the piston and nipple, having a side wall engaging the sleeve and an annular end engaging the said shoulder at the angle of the shoulder and the sleeve when the nipple and piston are in the assembled position, a tubular valve slidable in the opening of the shoulder structure, said valve having a closure head in the chamber with a resilient sealing means to engage the seat on the chamber when the valve is closed, said valve having an upper lateral port immediately below the head, such upper port being closed by the shoulder structure when the valve is in its closed position, the valve having a lower port always located in the space between the shoulder and the base of the cup washer, said space being a pressure space and defined when the valve is opened by the shoulder, the side wall and the base of the washer, the valve having an open lower end, the nipple having a cylindrical extension above its pressure surface to pass through the washer and thereby center the washer and also to engage the lower end of the valve to force the valve to its open position and form a tubular connection through the valve and through the nipple, the ports of the said valve being operative when the valve is in its open position to transmit pressure fluid to the said pressure space and thereby obtaining a tight seal of the cup washer against the shoulder, the sleeve, the piston and the nipple and the upper port and the open lower end of the valve being operative to transmit fluid directly through the valve and through the nipple.

11. A coupling having a cylindrical sleeve, an inturned shoulder with an opening therethrough communicating with a chamber, a tubular piston slidable in the sleeve, a tubular nipple engaging the piston, a resilient cup washer bearing on the sleeve, the piston and nipple, a tubular valve slidable in the said opening and having a closed head in the chamber and open at its opposite end, the head having a rivet, a resilient sealing washer attached to the head by the rivet, said washer engaging the base of the chamber when the valve is in its closed position, the valve having an upper port immediately below the washer, the valve having lower ports always in communication with the space below the shoulder defined by the shoulder, the sleeve and the cup washer, the said space being a pressure space, the nipple having the cylindrical extension extending through the washer and engaging the end of the valve to open the valve and afford a direct communication through the upper port and the open lower end of the valve and the nipple, fluid being adapted to pass through both ports of the valve and develop a pressure in the said pressure space and thereby cause the washer to form a tight seal against the sleeve, the piston and nipple.

12. A coupling as claimed in claim 11, the piston having an outwardly sloping conical surface and the cup washer having an annular fin to engage the said surface and the cylindrical sleeve, whereby under pressure developed in the pressure space, the fin forms a tight seal between the sleeve and the piston.

13. A coupling having a cylindrical sleeve, a tubular piston slidable in the sleeve and having an inner pressure surface and a short outwardly and downwardly inclined conical surface meeting the cylindrical sleeve, a washer seated on the pressure surface of the piston having an annular rim on the upper side and a tapered annular fin on the lower side engaging the outwardly inclined surface of the piston and the sleeve, a tubular nipple engaging the piston, and means to attach the nipple and piston together whereby a pressure developed on the washer forces the fin of the washer into close contact with the piston and the sleeve.

EDWIN C. MEYER.